US012715710B2

(12) United States Patent
Li et al.

(10) Patent No.: US 12,715,710 B2
(45) Date of Patent: Aug. 25, 2026

(54) AUTOMATIC BELT-SCRAPER-ADJUSTING DEVICE AND CONVEYOR BELT CLEANER HAVING THE SAME

(71) Applicant: JIMWAY ENTERPRISE CO., LTD., Kaohsiung (TW)

(72) Inventors: Chien-Tien Li, Kaohsiung (TW); Fu-Lung Hung, Kaohsiung (TW); Pi-Hui Yang, Kaohsiung (TW)

(73) Assignee: JIMWAY ENTERPRISE CO., LTD., Kaohsiung (TW)

( * ) Notice: Subject to any disclaimer, the term of this patent is extended or adjusted under 35 U.S.C. 154(b) by 81 days.

(21) Appl. No.: 18/779,717

(22) Filed: Jul. 22, 2024

(65) Prior Publication Data

US 2026/0021973 A1 Jan. 22, 2026

(51) Int. Cl.
*B65G 45/14* (2006.01)
*B65G 45/16* (2006.01)

(52) U.S. Cl.
CPC ............. *B65G 45/14* (2013.01); *B65G 45/16* (2013.01)

(58) Field of Classification Search
CPC ................................ B65G 45/14; B65G 45/16
USPC .......................................................... 198/499
See application file for complete search history.

(56) References Cited

U.S. PATENT DOCUMENTS 4,664,250 A * 5/1987 Jakobs .................. B65G 45/16 198/499
5,201,402 A * 4/1993 Mott ...................... B65G 45/16 198/499
5,975,281 A * 11/1999 Yoshizako ............. B65G 45/16 198/497
5,992,614 A * 11/1999 Mott ...................... B65G 45/16 198/499
6,056,112 A * 5/2000 Wiggins ................. B65G 45/16 198/497
6,296,105 B1 * 10/2001 Carnes ................... B65G 45/16 198/499
6,612,419 B1 * 9/2003 Watson .................. B65G 45/16 198/813
6,948,609 B2 * 9/2005 Finger .................... B65G 45/16 198/497
7,441,647 B2 * 10/2008 Wiggins ................. B65G 45/16 198/497
7,549,532 B2 * 6/2009 Ostman .................. B65G 45/16 198/497

(Continued)

*Primary Examiner* — Mark A Deuble
(74) *Attorney, Agent, or Firm* — RABIN & BERDO, P.C.

(57) ABSTRACT

An automatic belt-scraper-adjusting device configured to connect a pivot shaft of a scraper set of a conveyor belt cleaner comprises a shell seat, a connecting component and at least one force-applying assembly. The connecting component connected to the pivot shaft is rotatably mounted at the shell seat and is rotated along a preparing direction. The force-applying assembly mounted inside the shell seat and connected to the connecting component applies a steady force on the connecting component. A belt scraper of the scraper set is connected to the pivot shaft and abuts a conveyor belt, so the connecting component cannot be rotated. During cleaning the conveyor belt, the belt scraper is gradually worn off, so the force-applying assembly can rotate the connecting component along a direction opposite to the preparing direction. Therefore, the belt scraper continues to abut the conveyor belt automatically, cutting down labor and maintenance costs.

14 Claims, 16 Drawing Sheets

(56) References Cited

U.S. PATENT DOCUMENTS

| | | | | |
|---|---|---|---|---|
| 7,819,237 | B2 * | 10/2010 | Felton .................... | B65G 45/16 198/499 |
| 9,738,456 | B1 * | 8/2017 | Grimm .................. | B65G 45/12 |
| 10,351,351 | B2 * | 7/2019 | Schulte Strathaus .. | B65G 45/16 |

* cited by examiner 15
12
11
43
412
42
40
411
41

R
D
30
20
22
31
30
14
21

10
131
25
43
11
40
15
12
41
1

AUTOMATIC BELT-SCRAPER-ADJUSTING DEVICE AND CONVEYOR BELT CLEANER HAVING THE SAME

BACKGROUND OF THE INVENTION

1. Field of the Invention

The present invention relates to an automatic belt-scraper-adjusting device and a conveyor belt cleaner. The automatic belt-scraper-adjusting device is an adjusting device that can automatically adjust a belt scraper of a conveyor belt cleaner. The conveyor belt cleaner is used in a conveyor system and cleans a conveyor belt of the conveyor system.

2. Description of Related Art

A conveyor belt system is adopted to transfer raw materials such as ores. The conveyor belt system comprises a conveyor belt and multiple rollers. The multiple rollers are disposed apart from each other along a conveyor route. The conveyor belt is mounted around the multiple rollers and is driven to loop in rounds. The raw materials are loaded on the conveyor belt and are moved forward along with the conveyor belt.

When the conveyor belt transfers the raw materials to a discharging area, the raw materials are dropped from the conveyor belt and then the belt goes backward through the bottom side of the rollers. However, some of the raw materials may still remain on the surface of the conveyor belt when the conveyor belt moves backward. If the remains contact other components of the conveyor belt system, such as rollers, they might damage the components. Furthermore, if the remains adhere to the components, the adhered remains might contact and scratch other parts of the conveyor belt, which damages the conveyor belt as well.

Therefore, a conveyor belt cleaner is adopted to clean the conveyor belt. The conveyor belt cleaner is set below the conveyor belt, is adjacent to the discharging area, and comprises a belt scraper abutting the surface of the conveyor belt when it loops backward. While the conveyor belt continues to loop in rounds, the remains on the conveyor belt will be cleaned off by the belt scraper to make sure that no remains stay on the conveyor belt.

While the conveyor belt cleaner cleans the conveyor belt, the top of the belt scraper continuously contacts the conveyor belt, so the belt scraper is gradually worn off. It results in a gap occurring between the top of the belt scraper and the conveyor belt, so the belt scraper will not be able to steadily contact the conveyor belt, which means the conveyor belt cleaner cannot clean the remains on the conveyor belt. To avoid that, manually checking whether the belt scraper contacting the conveyor belt is the conventional method. If the belt scraper does not contact the conveyor belt, then the belt scraper needs to be adjusted. However, it raises labor costs to do the checking manually. Besides, dusts from dropping the raw materials at the discharging area block sight, so checking with naked eyes is hard to determine if the belt scraper contacts the conveyor belt. It could result in neglecting adjusting or maintaining the belt scraper, leading to the remains staying on the conveyor belt without being cleaned off. So, there is still room for improvement.

SUMMARY OF THE INVENTION

The main objective of the present invention is to provide an automatic belt-scraper-adjusting device and a conveyor belt cleaner to resolve the drawbacks of raising labor costs because a belt scraper of a conventional conveyor belt cleaner requires manual checking before adjustment. Furthermore, manual checking might lead to neglecting adjustments of the belt scraper, which therefore is unable to abut a conveyor belt of a conveyor belt system, and hence foreign remains would stay on the conveyor belt and might cause other components of the conveyor belt system to break.

The automatic belt-scraper-adjusting device is configured to be connected to a pivot shaft of a scraper set and comprises a shell seat, a connecting component, and at least one force-applying assembly. The shell seat is hollow internally. The connecting component is pivotably mounted at the shell seat and comprises a connecting portion, which is hollow along an axial direction of the connecting portion. The pivot shaft of the scraper set extends into the connecting portion and is fixedly connected to the connecting portion. The at least one force-applying assembly is mounted inside the shell seat, is connected to the connecting component, and applies a steady adjusting force to the connecting component. The connecting component is rotated along a preparing direction before connected to the pivot shaft, and then is rotated along a direction opposite to the preparing direction under the adjusting force applied by the at least one force-applying assembly, thereby driving the pivot shaft of the scraper set to rotate along the direction opposite to the preparing direction.

The automatic belt-scraper-adjusting device is adopted to a conveyor belt cleaner having a scraper set, which comprises a pivot shaft and a belt scraper that are connected to each other. The conveyor belt cleaner is set under a conveyor belt of a conveyor system. The belt scraper abuts the conveyor belt to clean remains on the conveyor belt. The connecting component is rotated along the preparing direction before connected to the pivot shaft, which is abutted by the conveyor belt, so the connecting component will not be rotated. During cleaning of the conveyor belt, the belt scraper is gradually worn off and becomes shorter, so the adjusting force that the at least one force-applying assembly applies on the connecting component can drive the connecting component to rotate. The connecting component and the pivot shaft are rotated along the direction opposite to the preparing direction. Therefore, the belt scraper can constantly contact and abut the conveyor belt to clean it. So, the belt scraper is automatically adjusted without manually adjusting or checking, effectively cutting down labor and maintenance costs.

The conveyor belt cleaner comprises a scraper set and at least one said automatic belt-scraper-adjusting device. The scraper set comprises a belt scraper and a pivot shaft connected to each other. The at least one automatic belt-scraper-adjusting device is disposed at an end of the pivot shaft, and the connecting portion of the connecting component of the at least one automatic belt-scraper-adjusting device is connected to the pivot shaft of the scraper set.

Cleaning the conveyor belt of the conveyor system by the conveyor belt cleaner can effectively clean the conveyor belt. Furthermore, the belt scraper needs no manual adjustment, so it will not happen that remains stay on the conveyor belt and damage other components of the conveyor system because the belt scraper cannot abut the conveyor belt, which is due to lack of adjustment.

DETAILED DESCRIPTION OF THE PREFERRED EMBODIMENT

Figure 1:
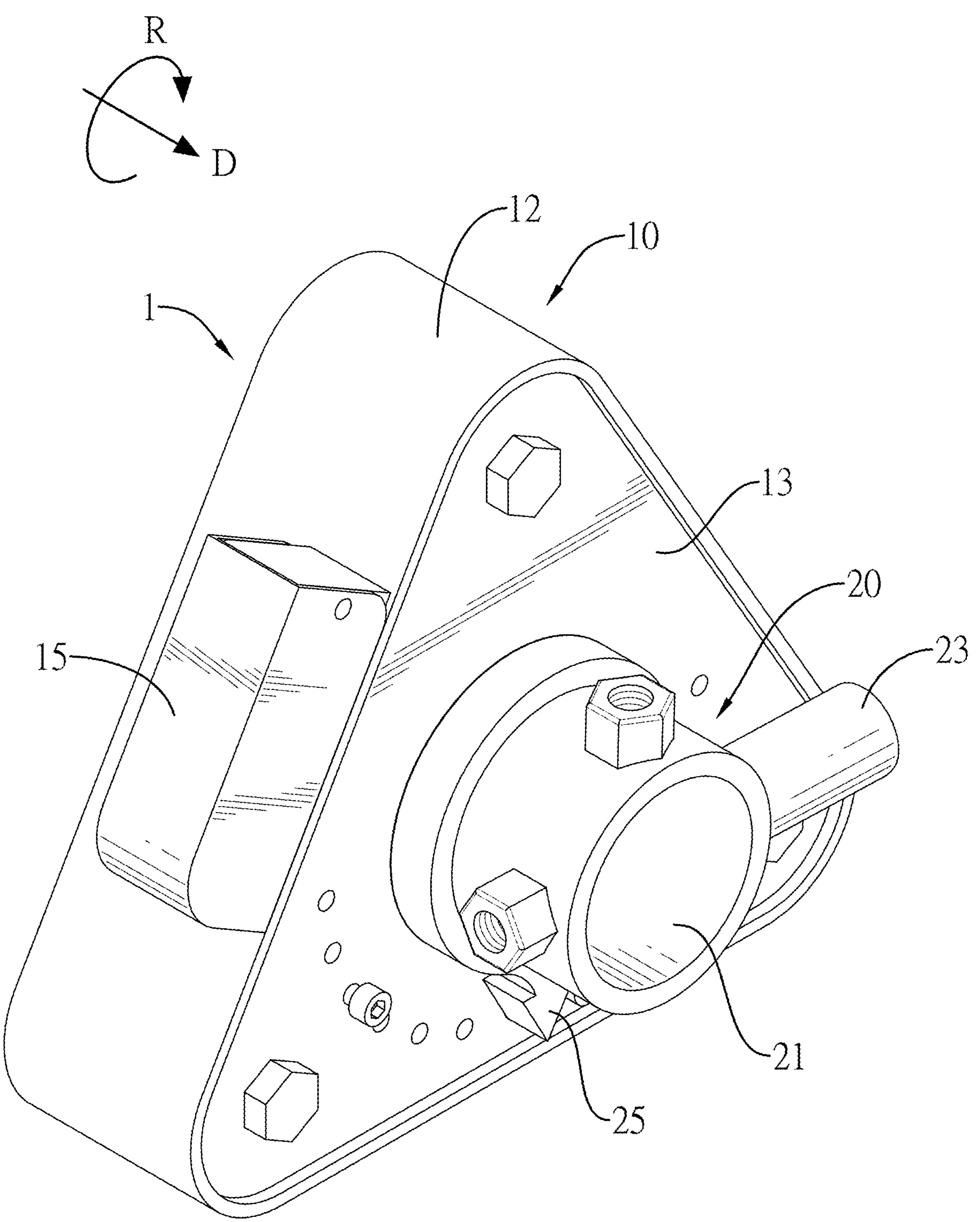
FIG. 1 is a perspective view of an embodiment of an automatic belt-scraper-adjusting device in accordance with the present invention.
Figure 2:
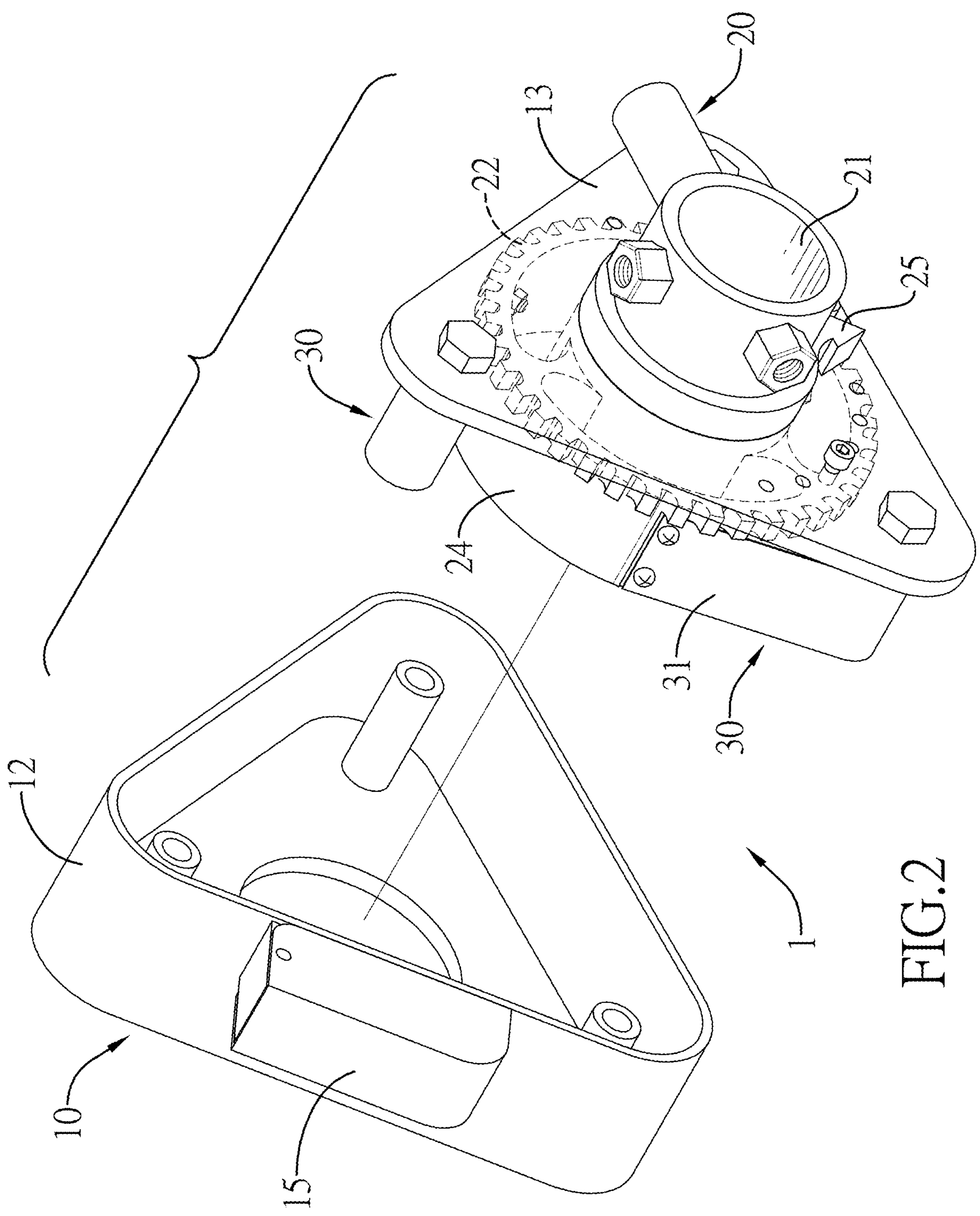
FIG. 2 is an exploded view of the automatic belt-scraper-adjusting device in FIG. 1.
Figure 14:
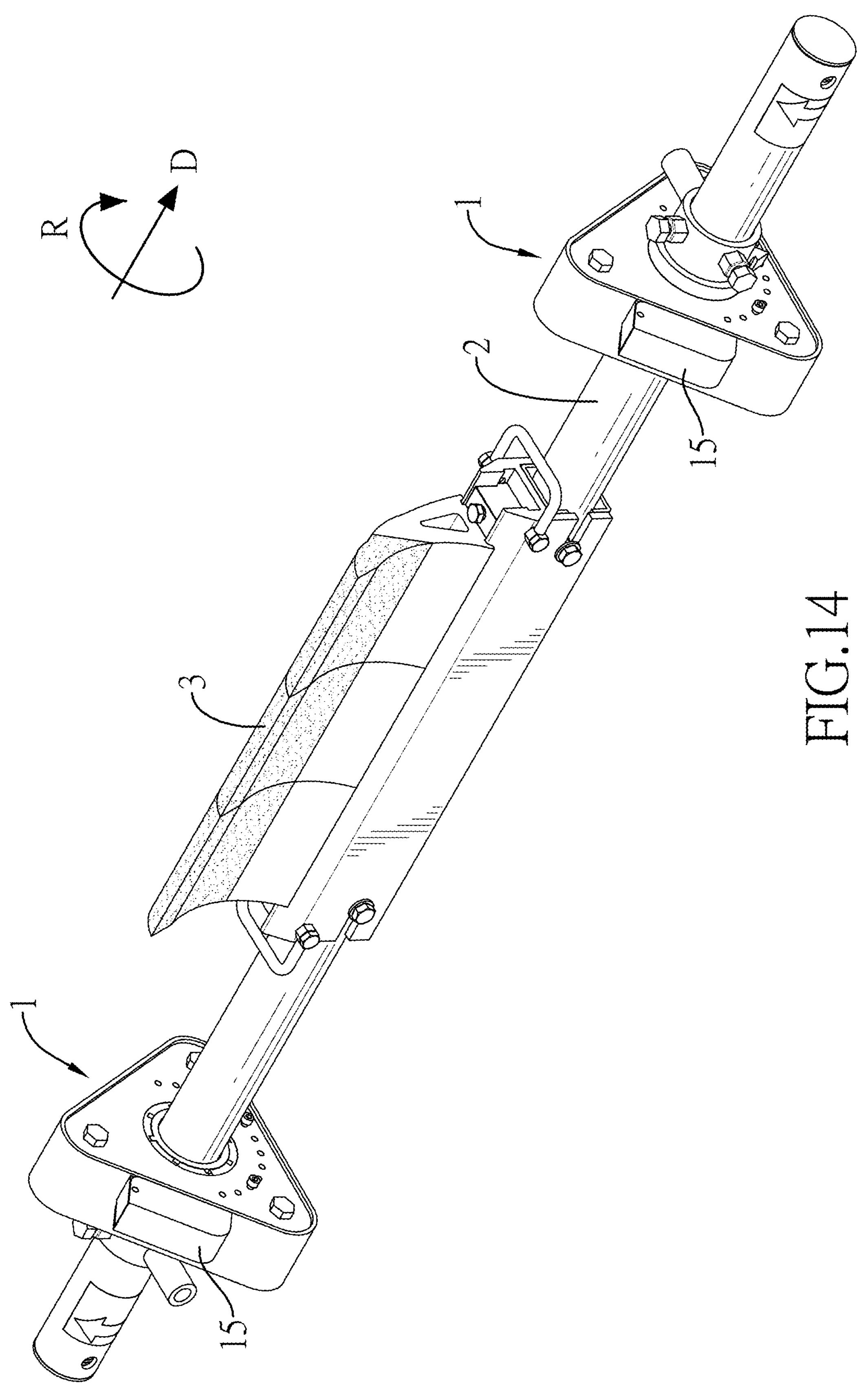
FIG. 14 is a perspective view of an embodiment of a conveyor belt cleaner in accordance with the present invention.

With reference to FIGS. 1, 2 and 14, an automatic belt-scraper-adjusting device and a conveyor belt cleaner in accordance with the present invention are shown.

Figure 15:
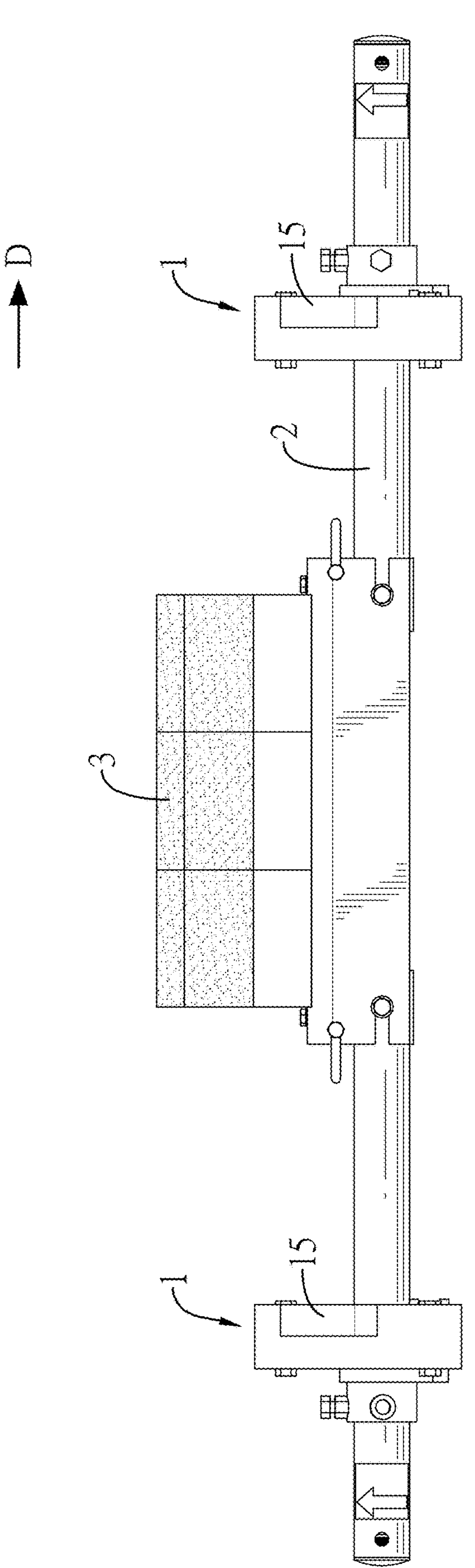
FIG. 15 is a side view of the conveyor belt cleaner.
Figure 16:
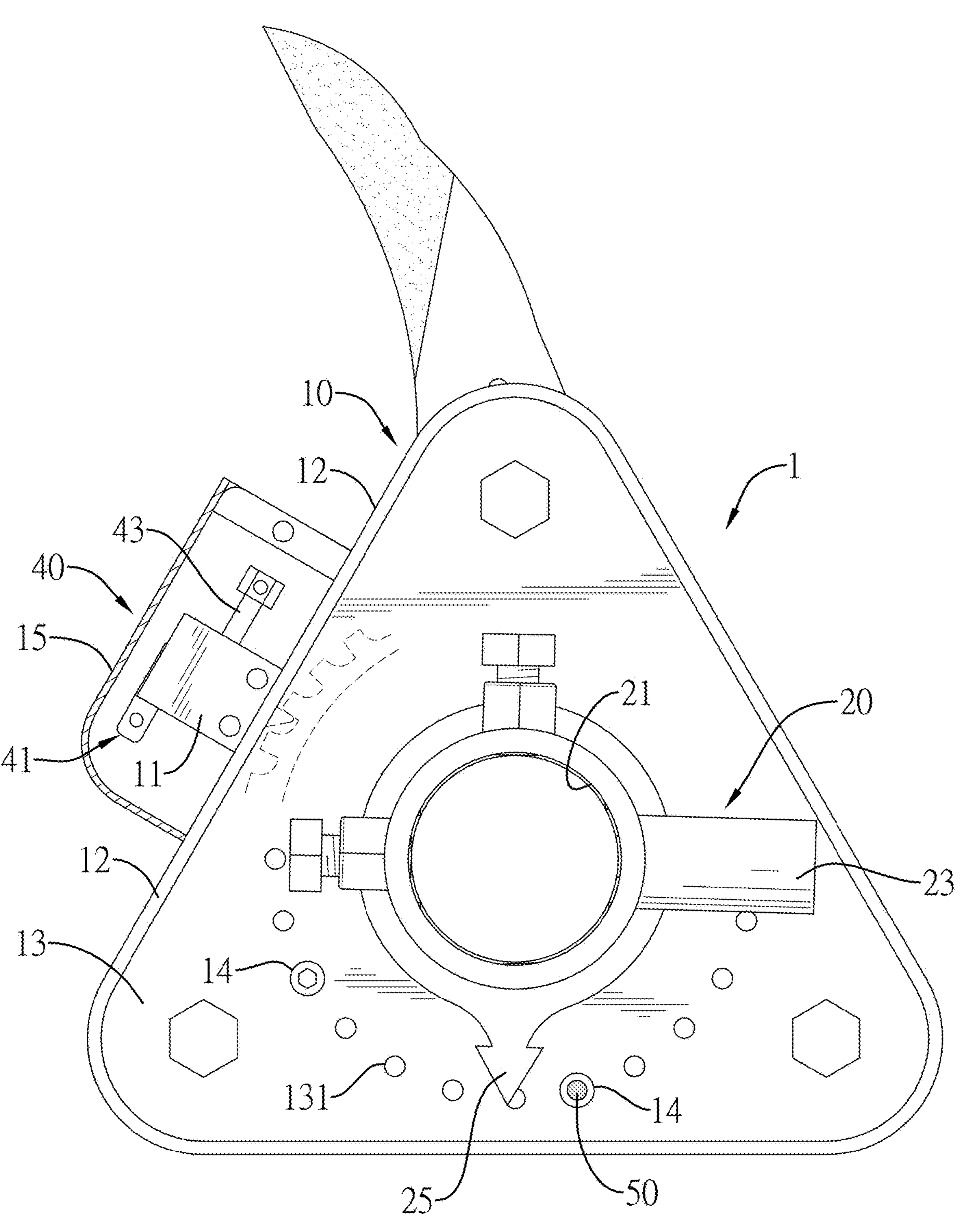
FIG. 16 is a front view of an interior of a shell seat of the conveyor belt cleaner.

With reference to FIGS. 14 to 16, the conveyor belt cleaner comprises a scraper set and at least one automatic belt-scraper-adjusting device 1. The scraper set comprises a pivot shaft 2 and a belt scraper 3 connected to each other. The automatic belt-scraper-adjusting device 1 is disposed at an end of the pivot shaft 2 and is connected to the pivot shaft 2.

With reference to FIGS. 1 to 3 and 14, the automatic belt-scraper-adjusting device 1 is connected to the pivot shaft 2 of the scraper set and comprises a shell seat 10, a connecting component 20, and at least one force-applying assembly 30.

With reference to FIGS. 1 to 3 and 6, the shell seat 10 is hollow internally. The connecting component 20 is pivotably mounted at the shell seat 10 and comprises a connecting portion 21. The connecting portion 21 is connected to the pivot shaft 2 of the scraper set, and is hollow along an axial direction D of the connecting portion 21. The pivot shaft 2 of the scraper set extends into the connecting portion 21 and is fixedly connected to the connecting portion 21. The pivot shaft 2 is parallel to the axial direction D.

Figure 3:
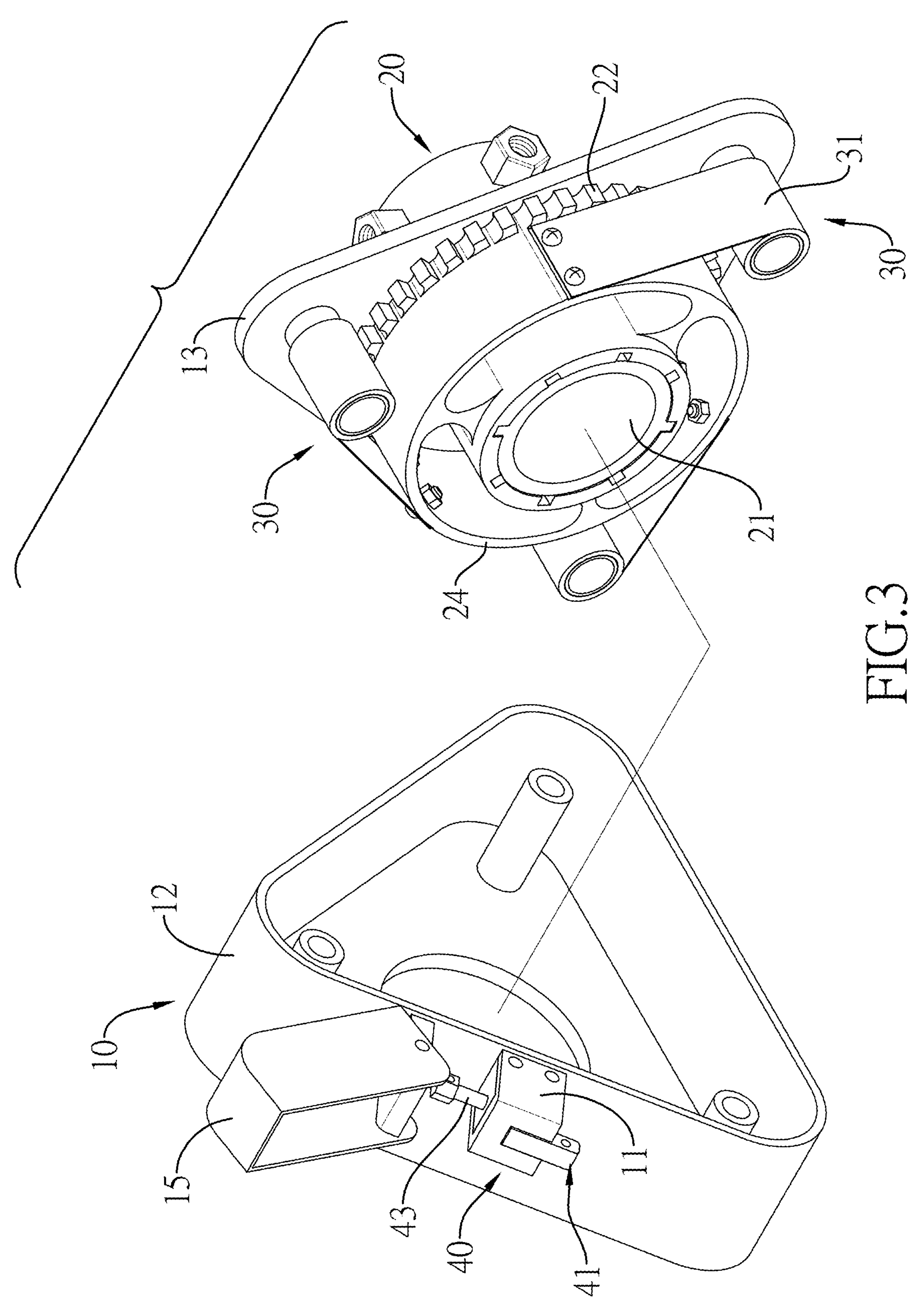
FIG. 3 is another exploded view of the automatic belt-scraper-adjusting device in FIG. 1.
Figure 6:
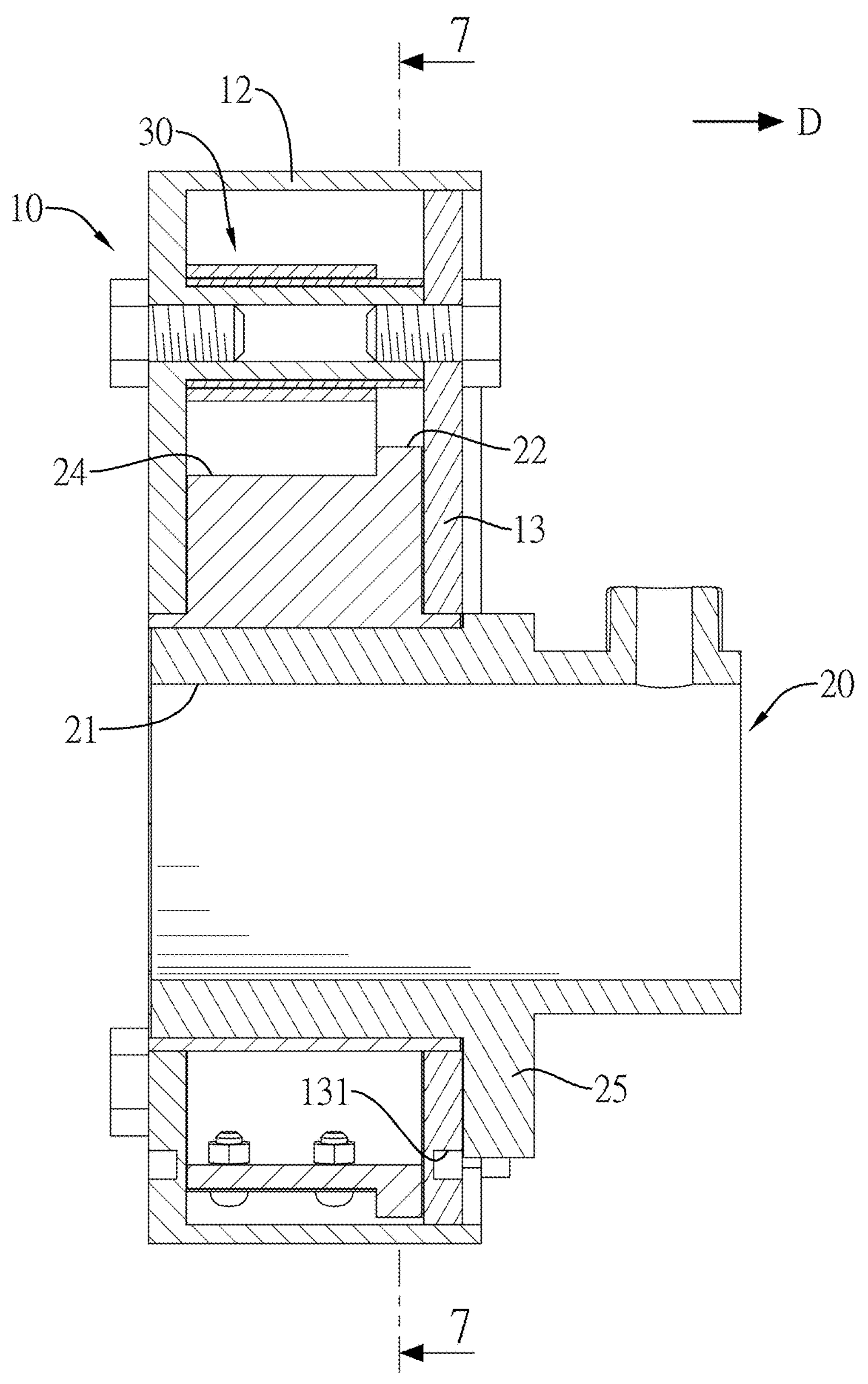
FIG. 6 is a side sectional view of the automatic belt-scraper-adjusting device.

With reference to FIGS. 2, 3 and 6, the at least one force-applying assembly 30 is mounted inside the shell seat 10, is connected to the connecting component 20, and applies a steady adjusting force to the at least one force-applying assembly 30.

Additionally, the connecting component 20 can be rotated along a preparing direction R, and then is rotated along a direction opposite to the preparing direction R under the adjusting force applied by the at least one force-applying assembly 30. Therefore, the connecting component 20 drives the pivot shaft 2 of the scraper set to rotate along the direction opposite to the preparing direction R.

Figure 8:
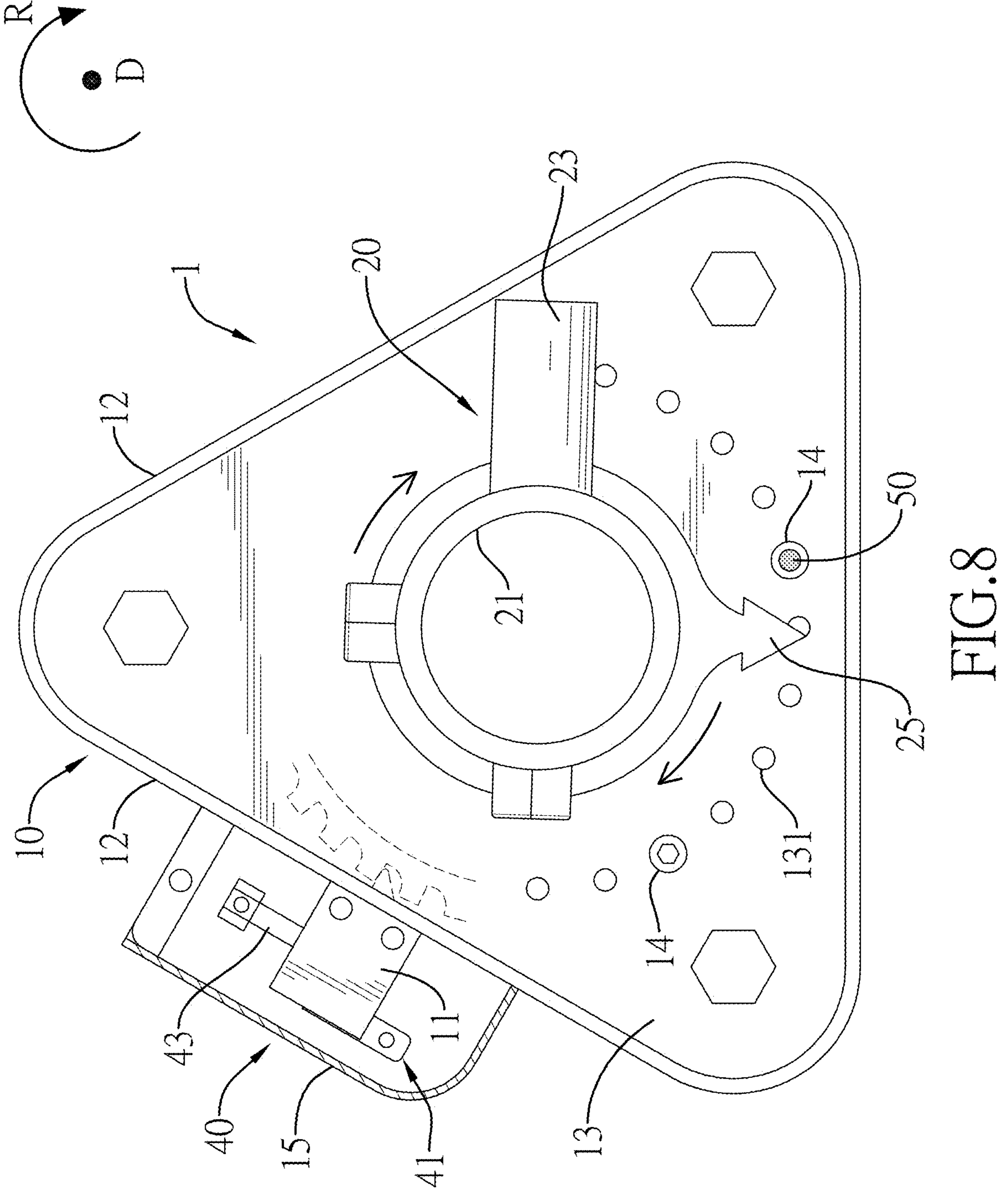
FIG. 8 is a front view of the automatic belt-scraper-adjusting device with a connecting component unrotated.
Figure 10:
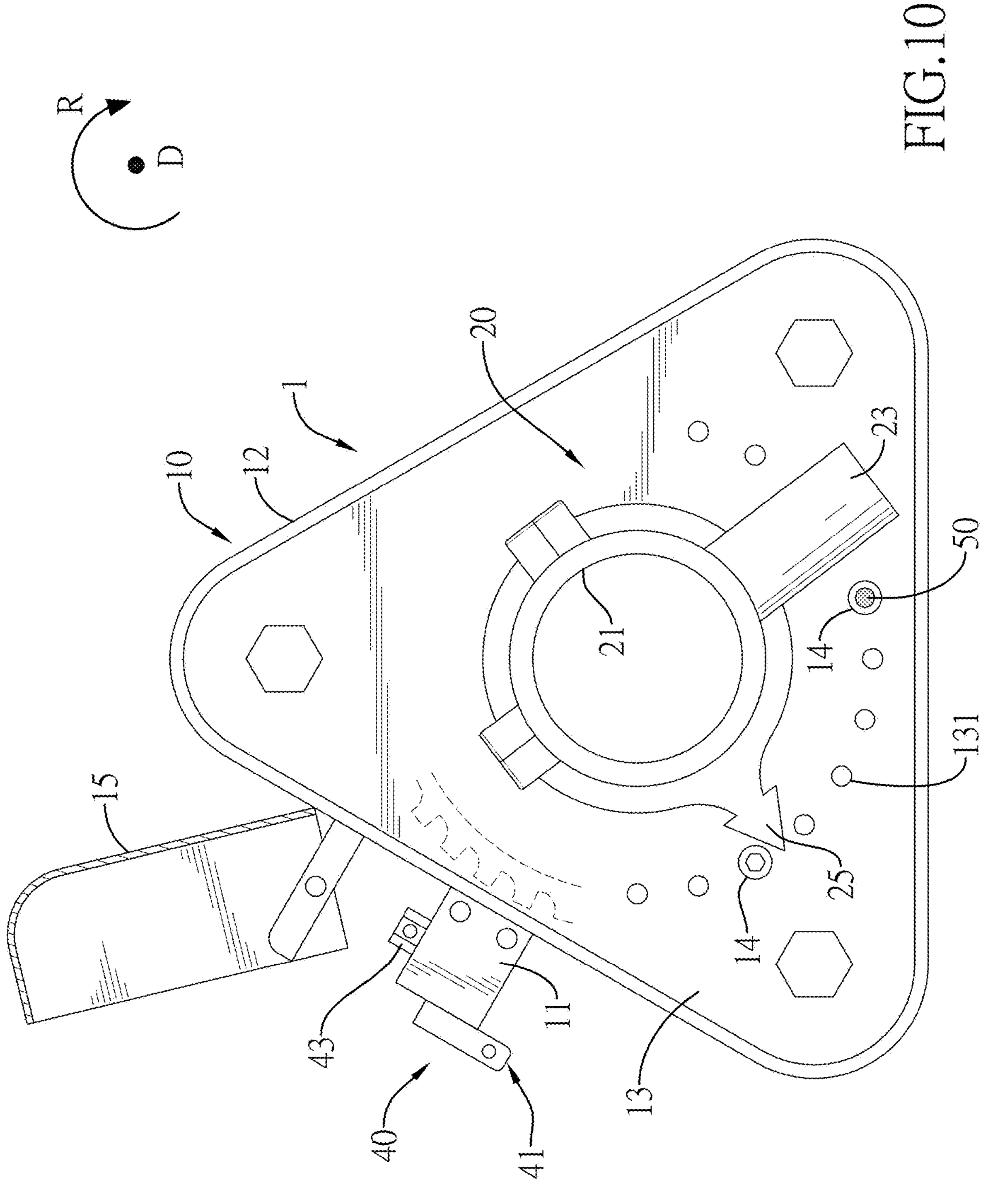
FIG. 10 is a front view of the automatic belt-scraper-adjusting device with the connecting component rotated along a preparing direction.

With reference to FIG. 16, the conveyor belt cleaner is set under a conveyor belt of a conveyor system and cleans remains on the conveyor belt by a top end of the belt scraper 3, which abuts the conveyor belt. As shown in FIGS. 8 and 10, the connecting component 20 is rotated along the preparing direction R before connected to the pivot shaft 2 of the scraper set. Because the belt scraper 3 is abutted by the conveyor belt, the connecting component 20 will not be rotated.

Figure 12:
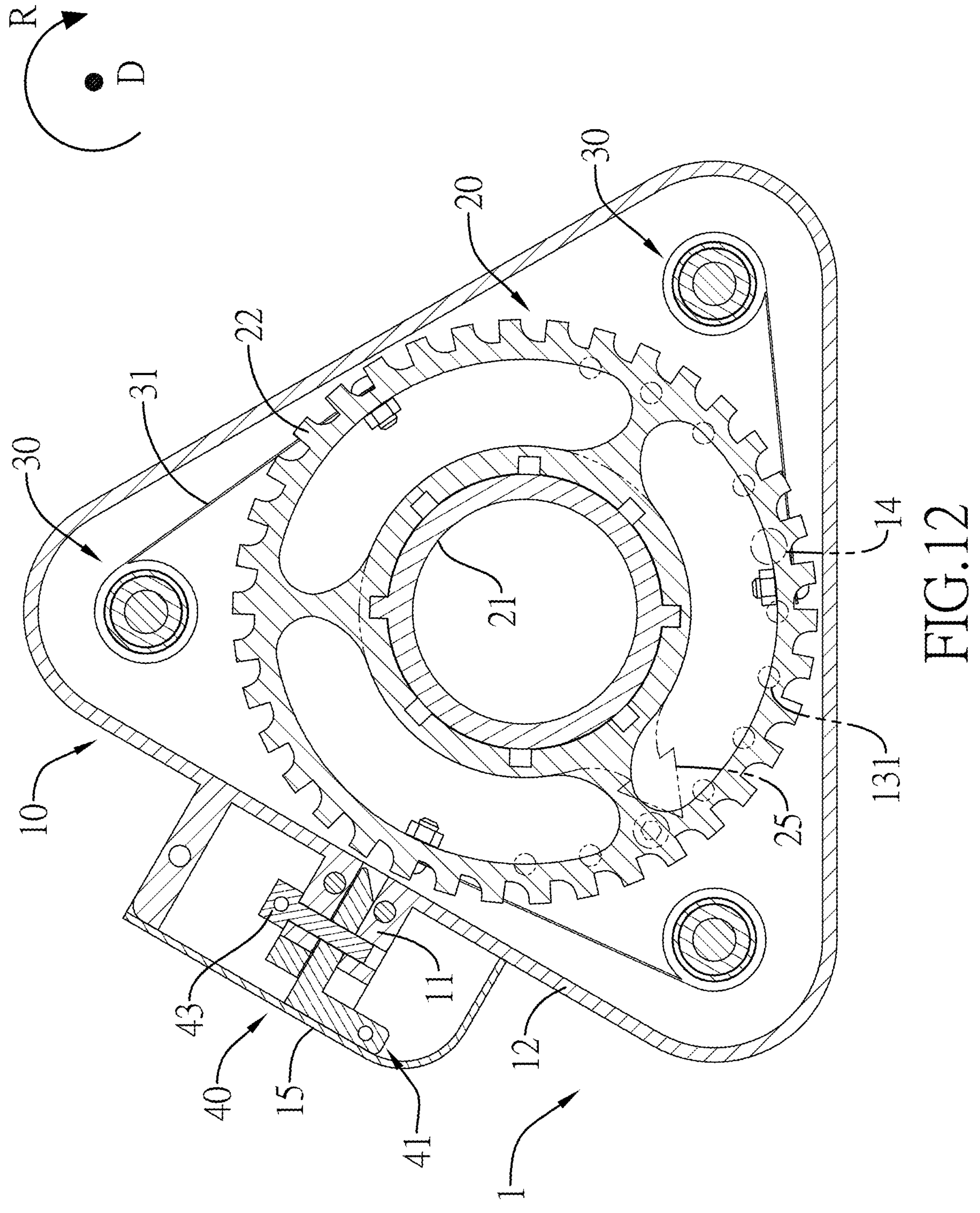
FIG. 12 is a partially sectional view of the automatic belt-scraper-adjusting device with the connecting component rotated.
Figure 13:
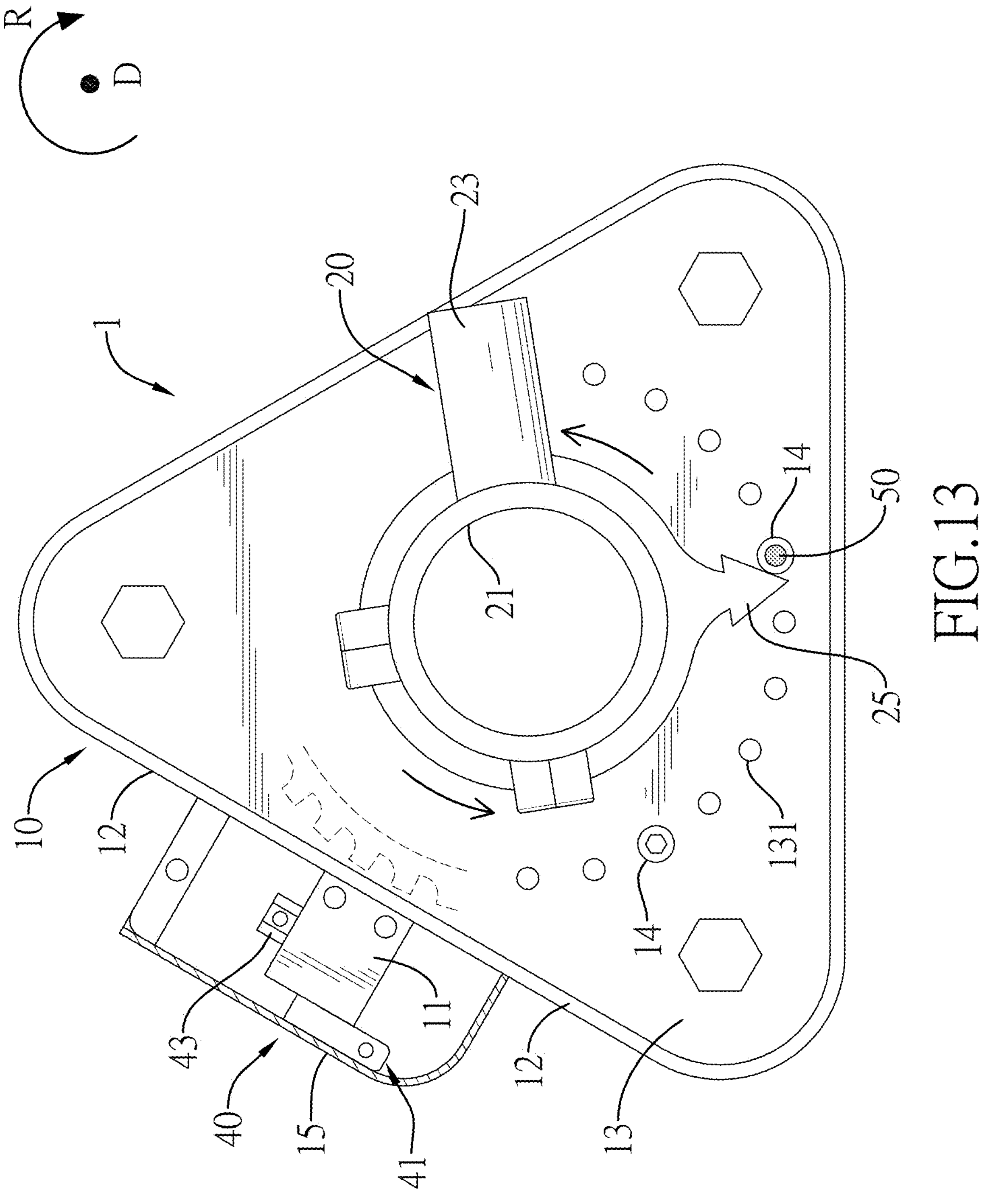
FIG. 13 is a front view of the automatic belt-scraper-adjusting device with the connecting component rotated by at least one force-applying assembly along a direction opposite to the preparing direction.

As shown in FIGS. 10, 12 and 13, while the belt scraper 3 abuts and cleans the conveyor belt, the top end of the belt scraper 3 is gradually worn off and becomes shorter, so the adjusting force that the at least one force-applying assembly 30 applies on the connecting component 20 can drive the connecting component 20 to rotate along the direction opposite to the preparing direction R. The pivot shaft 2 of the scraper set is rotated along the direction opposite to the preparing direction R, along with the connecting component 20. Hence, the belt scraper 3 can constantly contact and abut the conveyor belt to clean it. Therefore, the belt scraper is automatically adjusted without manually adjusting or checking, effectively cutting down labor and maintenance costs. Besides, it will not happen that the remains stay on the conveyor belt and damage other components of the conveyor system because of the belt scraper 3 cannot abut the conveyor belt, which is due to lack of adjustment.

Additionally, as shown in FIGS. 14 and 15, in this embodiment, the conveyor belt cleaner comprises two said automatic belt-scraper-adjusting devices 1 respectively disposed at two opposite ends of the pivot shaft 2. Therefore, the at least one force-applying assembly 30 of each of the two automatic belt-scraper-adjusting devices 1 applies force on the pivot shaft 2 together. In another embodiment of the present invention, only one of the two ends of the pivot shaft 2 is connected to the automatic belt-scraper-adjusting device 1, while the other one of the two ends of the pivot shaft 2 is accommodated by a bearing seat.

Besides, as shown in FIG. 13, the automatic belt-scraper-adjusting device 1 comprises a warning module 50 mounted at the shell seat 10 and can sense rotational movements of the connecting component 20. When the connecting component 20 is rotated along the direction opposite to the preparing direction R to a terminal position, the warning module 50 gives out a warning. When the connecting component 20 is rotated to the terminal position, it means the belt scraper 3 is worn off to the point that it needs replacement. The warning module 50 can sense whether the connecting component 20 is rotated to the terminal position through contacting or contactless sensing. Besides, the warning module 50 can give out the warning through sounds, lights or sending signals to external devices to remind staff members to do maintenance work, such as changing the belt scraper 3 or re-rotating the connecting component 20. By the warning module 50, convenience of use of the present invention is increased.

Figure 4:
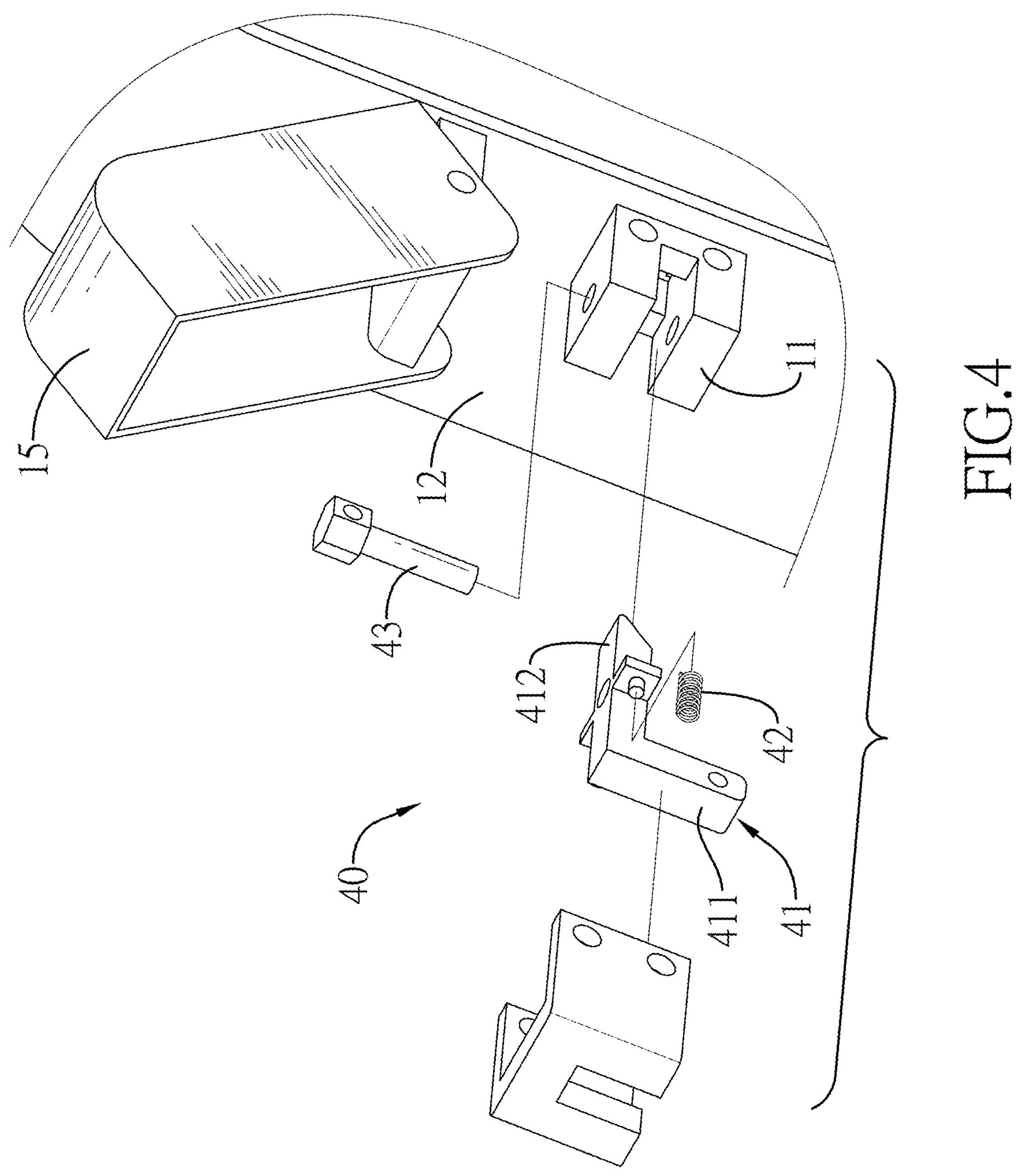
FIG. 4 is a partially exploded view of a latch assembly of the automatic belt-scraper-adjusting device.
Figure 5:
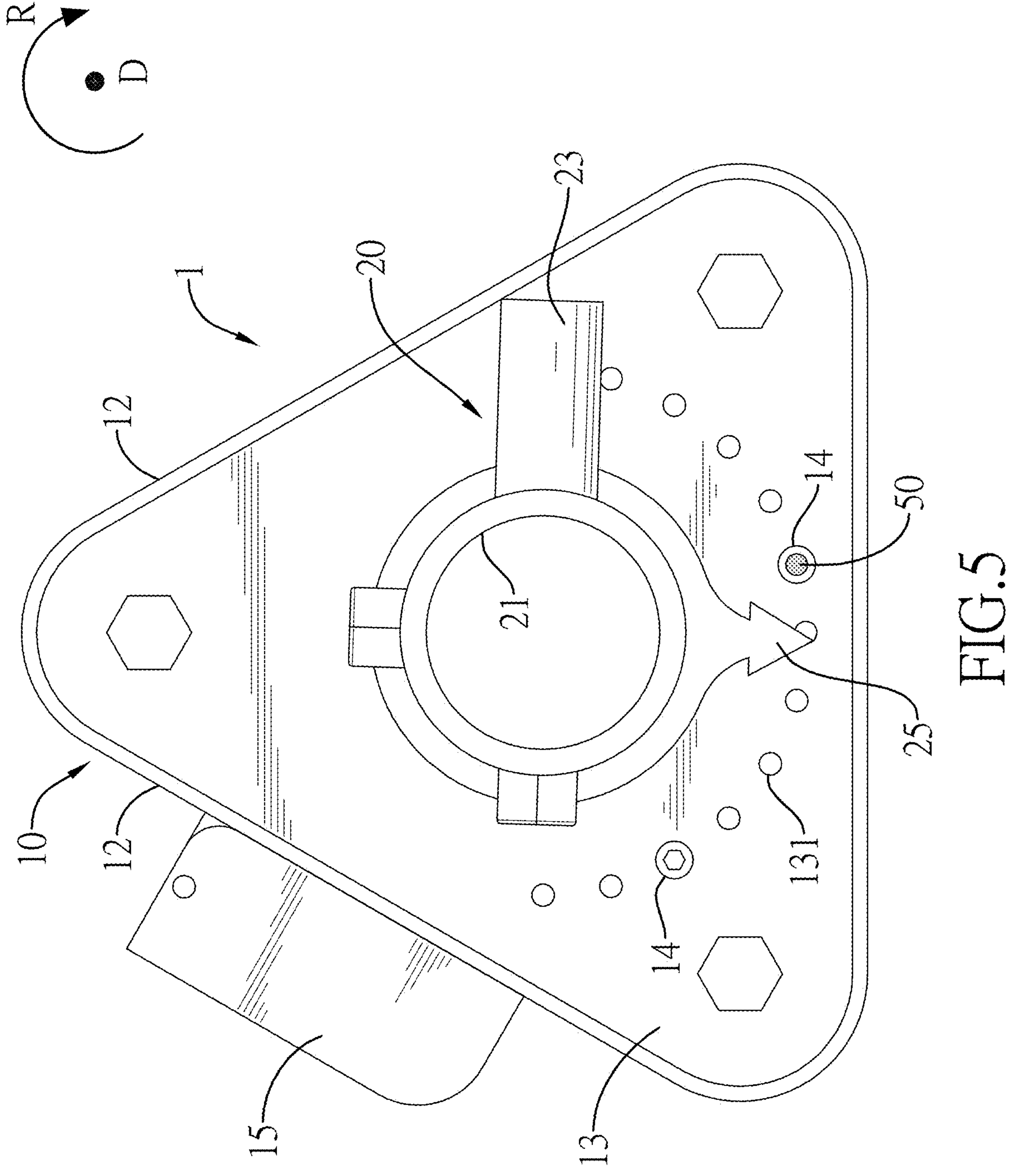
FIG. 5 is a front view of the automatic belt-scraper-adjusting device.
Figure 7:
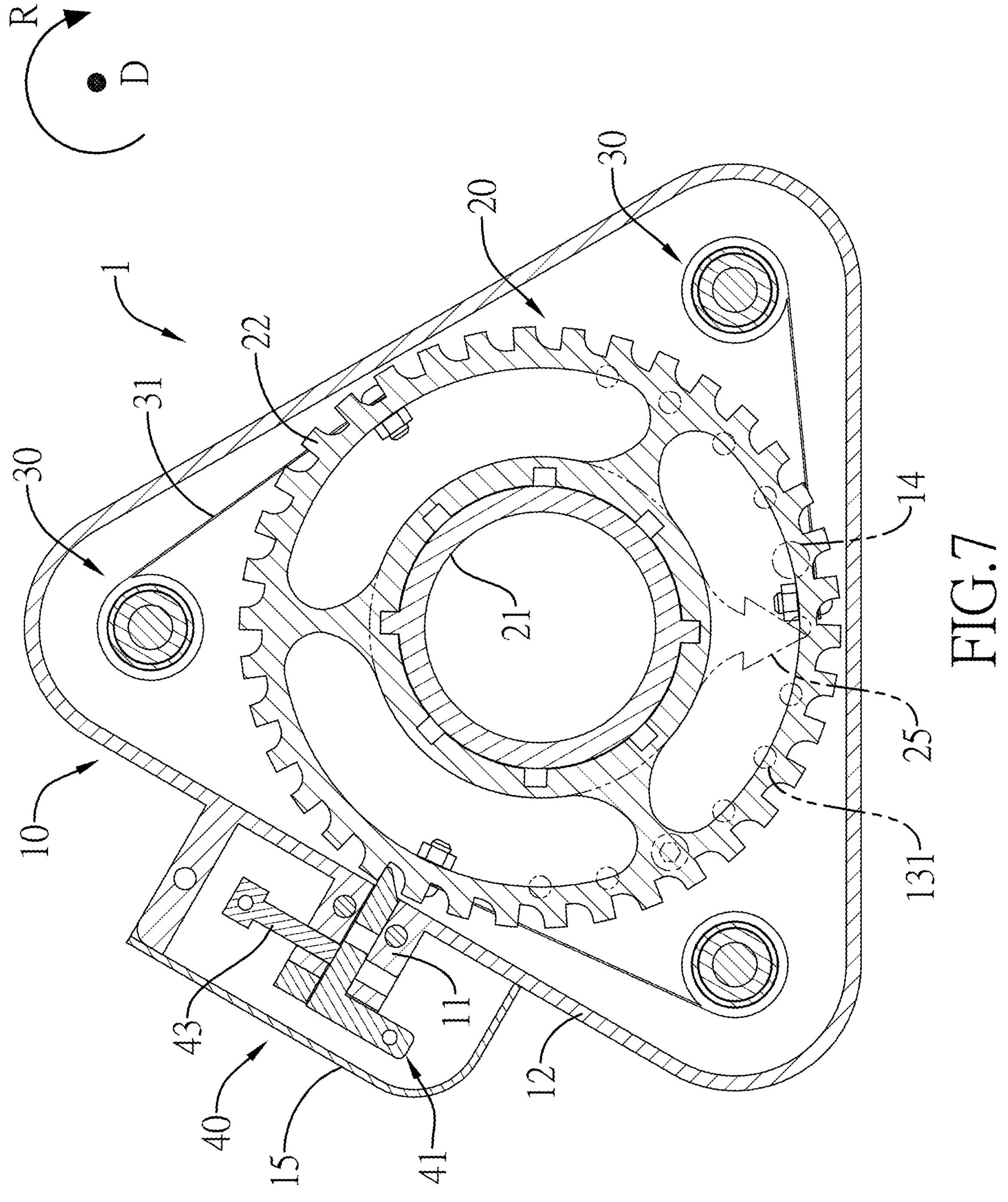
FIG. 7 is a sectional view across line 7-7 in FIG. 6.
Figure 11:
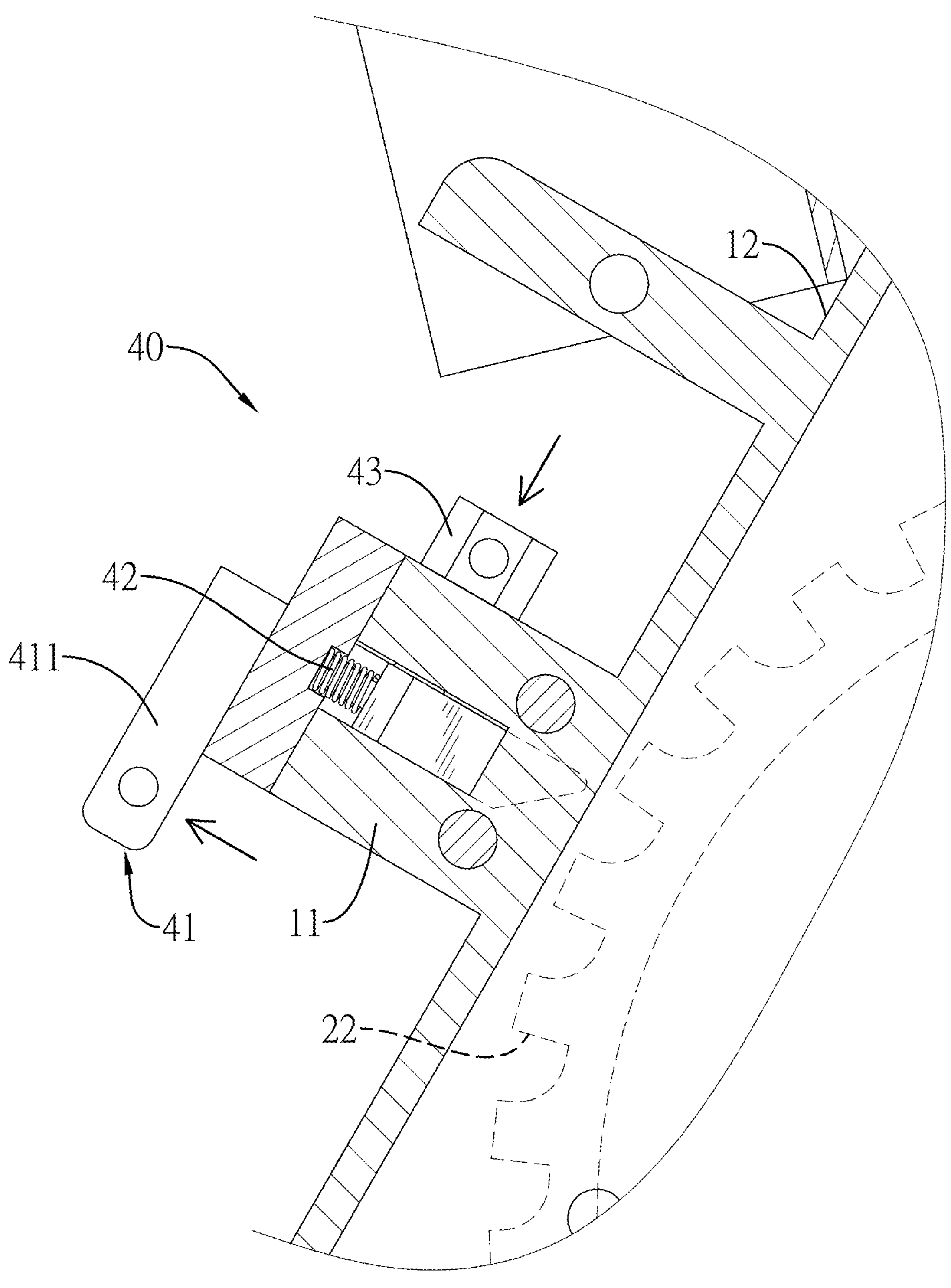
FIG. 11 is a partially sectional view of the latch assembly of the automatic belt-scraper-adjusting device with the connecting component rotated along the preparing direction.

In addition, as shown in FIGS. 3 and 4, the automatic belt-scraper-adjusting device 1 comprises a latch assembly 40, which comprises an engaging latch 41 and at least one latch elastic element 42. The engaging latch 41 is mounted at the shell seat 10 and comprises an operated section 411 and an engaging section 412 connected to each other. The operated section 411 is disposed at an outer side of the shell seat 10. The engaging section 412 extends into the shell seat 10. The at least one latch elastic element 42 is mounted at the outer side of the shell seat 10 and abuts the engaging latch 41 and the shell seat 10. As shown in FIG. 7, the connecting component 20 comprises a ratchet portion 22. The engaging latch 41 is pushed by the at least one latch elastic element 42 so the engaging section 412 abuts the ratchet portion 22 of the connecting component 20, thereby avoiding the ratchet portion 22 being rotated along the direction opposite to the preparing direction R. As shown in FIGS. 11 and 12, when the operated section 411 is operated, the at least one latch elastic element 42 is compressed and the engaging section 412 is detached from the ratchet portion 22 of the connecting component 20, therefore the connecting component 20 can be rotated along the direction opposite to the preparing direction R by the at least one force-applying assembly 30.

Figure 9:
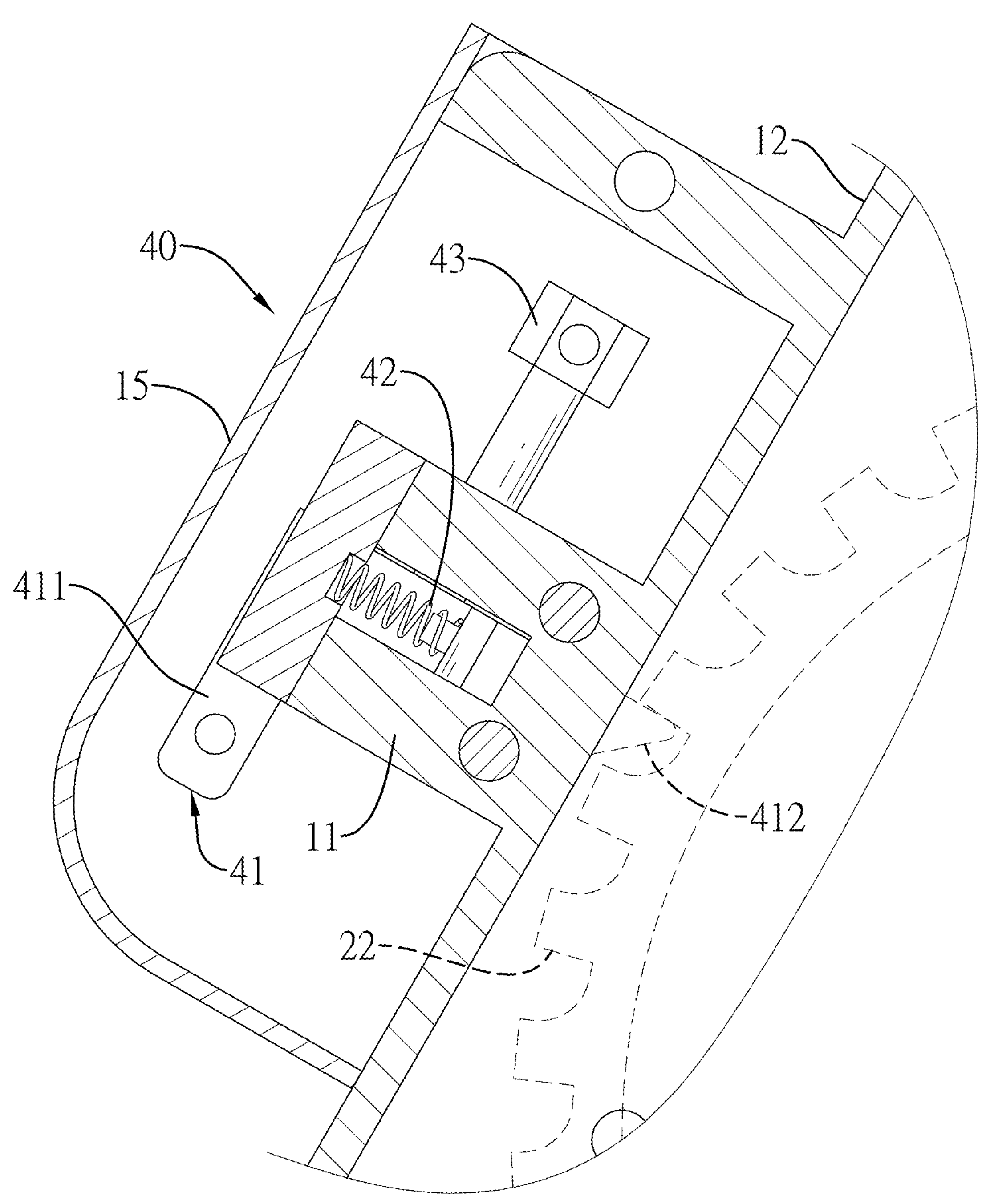
FIG. 9 is a sectional view of the latch assembly of the automatic belt-scraper-adjusting device with the connecting component unrotated.

Furthermore, as shown in FIGS. 3 and 4, the shell seat 10 comprises a latch-installing portion 11 and a dust-proof cap 15. The latch assembly 40 is mounted at the latch-installing portion 11 and is disposed inside the dust-proof cap 15. Hence, the operated section 411 of the engaging latch 41 is disposed outside of the shell seat 10 but is inside the dust-proof cap 15 to be covered. The latch assembly 40 comprises a plug 43 movably mounted at the latch-installing portion 11. As shown in FIGS. 10 to 12, when the engaging section 412 of the engaging latch 41 is detached from the ratchet portion 22 of the connecting component 20, the plug 43 can be inserted into the engaging latch 41 to prevent it from moving. As shown in FIGS. 8 and 9, when the plug 43 and the engaging latch 41 are detached, the engaging section 412 of the engaging latch 41 is pushed by the at least one latch elastic element 42 to abut the ratchet portion 22 of the connecting component 20. By the dust-proof cap 15 covering the latch assembly 40, dusts will not enter the shell seat 10 through the latch assembly 40.

As shown in FIGS. 8 and 9, before connecting the connecting component 20 and the pivot shaft 2 of the scraper set, directly rotating the connecting component 20 can rotate the connecting component 20 along the preparing direction R. At the same time, the at least one latch elastic element 42 presses the engaging section 412 to abut the ratchet portion 22 of the connecting component 20, thereby preventing the connecting component 20 being rotated along the direction opposite to the preparing direction R. The connecting portion 21 of the connecting component 20 is connected to the pivot shaft 2 with the belt scraper 3 abutted by the conveyor belt. Then, as shown in FIGS. 10 to 12, the dust-proof cap 15 is opened and the operated section 411 of the engaging latch 41 of the latch assembly 40 is pulled outwardly, so the engaging section 412 of the engaging latch 41 is detached from the ratchet portion 22 of the connecting component 20. After that, operating the plug 43 to insert it into the engaging latch 41, so the engaging latch 41 will not be pressed and moved by the at least one latch elastic element 42 to prevent the engaging latch 41 and the connecting component 20 contacting each other. Which being said, the connecting component 20 is only affected by pressure that is generated by the belt scraper 3 abutting the conveyor belt and the adjusting force applied by the at least one force-applying assembly 30. As shown in FIG. 13, while the belt scraper 3 is worn off gradually, the connecting component 20 can be rotated by the at least one force-applying assembly 30 to automatically adjust the belt scraper 3.

Preferably, as shown in FIGS. 3 and 7, each one of the at least one force-applying assembly 30 is a constant-force spring and comprises an elastic ribbon 31 rolled up. Two opposite ends of the elastic ribbon 31 are respectively a center end and a force-applying end. The center end of the elastic ribbon 31 is fixedly mounted at the shell seat 10. The force-applying end of the elastic ribbon 31 is mounted at the connecting component 20. When the force-applying end of the elastic ribbon 31 is pulled so the elastic ribbon 31 is stretched, the elastic ribbon 31 applies the adjusting force to the connecting component 20. Adopting the constant-force spring as the at least one force-applying assembly 30, the automatic belt-scraper-adjusting device 1 is operated mechanically without using electrical energy or other electrical motor to rotate the connecting component 20, thereby lowering costs of use and increasing convenience of use.

Besides, if the belt scraper 3 contacts some of the remains protruding from the conveyor belt while cleaning the conveyor belt, the protruding remains might cause a sudden great pressure to the belt scraper 3. At this time, by adopting the constant-force spring as the at least one force-applying assembly 30, the connecting component 20 can still be rotated along the preparing direction R for a short time, so that the belt scraper 3 can be detached from the conveyor belt momentarily. After the protruding remains pass, the at least one force-applying assembly 30 will still drive the connecting component 20 to rotate so the belt scraper 3 still abuts the conveyor belt, thereby preventing the protruding remains on the conveyor belt from damaging the conveyor belt cleaner.

Besides, the at least one force-applying assembly 30 is detachably mounted inside the shell seat 10 and is therefore changeable. The adjusting force provided by the at least one force-applying assembly 30 can be decided according to different pressures that are applied on the belt scraper 3 of the scraper set when the belt scraper 3 abuts different conveyor belts, while the belt scraper 3 might be made from different materials accordingly. For example, as shown in FIG. 7, in this embodiment, a number of the at least one force-applying assembly 30 is three. The three force-applying assemblies 30 share the adjusting force, which is in balance with the pressure, that the belt scraper 3 needs in order to steadily abut the conveyor belt. Alternatively, using only one said force-applying assembly 30 can still provide the adjusting force that the belt scraper 3 needs. Therefore, there is higher flexibility of choices of the at least one force-applying assembly 30.

Preferably, the shell seat 10 is triangular. The connecting component 20 is mounted at a center of the shell seat 10 and the three force-applying assemblies 30 surround the connecting component 20. Therefore, the automatic belt-scraper-adjusting device 1 is a compact configuration in whole.

Additionally, when the connecting component 20 is rotated along the preparing direction R, the at least one force-applying assembly 30 generates the adjusting force. Which being said, as shown in FIGS. 7 and 12, while adjusting the connecting component 20 so that it is rotated to a start position along the preparing direction R, the elastic ribbon 31 of the at least one force-applying assembly 30 is stretched and generates the adjusting force simultaneously. Hence, there is no need to adjust the connecting component 20 and the at least one force-applying assembly 30 separately, thereby increasing convenience of use.

Furthermore, as shown in FIGS. 1 and 8, the connecting component 20 comprises an operating end extending out of the shell seat 10, and comprises a rotation-operating portion 23, which is disposed at the operating end, is disposed outside the shell seat, and extends along a direction perpendicular to the axial direction D. The rotation-operating portion 23 is used to rotate the connecting component 20 along the preparing direction R. The staff members attach a tool to the rotation-operating portion 23 to rotate the connecting component 20, thereby saving manual force and increasing convenience of use.

Besides, as shown in FIGS. 3, 5, 7 and 10, the connecting component 20 comprises a force-applied portion 24 and a pointing element 25. The at least one force-applying assembly 30 is connected to the force-applied portion 24 of the connecting component 20. The shell seat 10 comprises an outer shell 12 and a front panel 13 mounted at a front side of the outer shell 12. The at least one force-applying assembly 30 and the force-applied portion 24 of the connecting component 20 are disposed inside the outer shell 12 and are disposed in an inner side of the front panel 13. The front panel 13 comprises multiple guiding marks 131 formed at an outer surface of the front panel 13 and spaced apart from each other. The pointing element 25 is adjacent to the front panel 13 and is rotated along with the connecting component 20 to point to different ones of the multiple guiding marks 131. Because different belt scrapers 3 of different scraper sets have different tolerances of wear, they offer different rotational degrees to the connecting component 20 accordingly. Therefore, by cooperating the pointing element 25 with the multiple guiding marks 131 of the front panel 13, when adjusting rotational degree of the connecting component 20, the pointing element 25 and the multiple guiding marks 131 remind the staff members to which position they should rotate the connecting component 20, thereby efficiently increasing convenience of use.

Moreover, as shown in FIGS. 6, 8, 10 and 13, the multiple guiding marks 131 of the front panel 13 are recessed in shape. The shell seat 10 comprises at least one guiding rod 14. Each of the at least one guiding rod 14 is detachably mounted at one of the multiple guiding marks 131. The pointing element 25 can contact the at least one guiding rod 14. One of the at least one guiding rod 14 is attached to the guiding mark 131, which the pointing element 25 points to when the connecting component 20 is rotated to the start position. The pointing element 25 reminds the staff members where the connecting component 20 should be rotated to when adjusting, thereby avoiding over-adjustment. In another embodiment, the shell seat 10 comprises multiple said at least one guiding rod 14, the multiple guiding rods 14 are respectively attached to two of the multiple guiding marks 131, which the pointing element 25 respectively points to when the connecting component 20 is rotated to the start position and to the terminal position. Besides, to which guiding mark 131 the at least one guiding rod 14 is attached can be altered to cooperate with how much the connecting component 20 should be rotated according to different scraper sets, thereby further increasing convenience of use.

Additionally, in this embodiment, the warning module 50 is a contact sensor and is mounted at one of the at least one guiding rod 14 to which the pointing element 25 points when the connecting component 20 is rotated to the terminal position. Therefore, when the connecting component 20 is rotated to the terminal position, the pointing element 25 contacts said guiding rod 14, and thus the warning module 50 gives out warning.

Preferably, the outer shell 12 and the front panel 13 of the shell seat 10 are water-proof and dust-proof to avoid environmental dusts entering the shell seat 10, thereby avoiding the connecting component 20 or the at least one force-applying assembly 30 being affected to increase an environmental adaptability of the automatic belt-scraper-adjusting device 1.

Besides, as shown in FIG. 14, in this embodiment, the rotation-operating portion 23 of each one of the two automatic belt-scraper-adjusting devices 1 of the conveyor belt cleaner faces outwardly of the conveyor belt cleaner. The latch assembly 40 of each one of the two automatic belt-scraper-adjusting devices 1 is disposed at different sides of the shell seat 10 of corresponding automatic belt-scraper-adjusting device 1. Therefore, the latch assembly 40 of each one of the two automatic belt-scraper-adjusting devices 1 faces a front side of the conveyor belt cleaner to facilitate the staff members to operate the latch assembly 40 of each one of the two automatic belt-scraper-adjusting devices 1; however configurations of the conveyor belt cleaner are not limited to that.

To sum up, the automatic belt-scraper-adjusting device 1 is configured to automatically adjust the belt scraper 3 of the scraper set. The conveyor belt cleaner is configured to clean the conveyor belt of the conveyor system. First, the connecting component 20 is rotated along the preparing direction R, then the connecting component 20 is connected to the pivot shaft 2 of the scraper set, while the belt scraper 3 abuts the conveyor belt. While the belt scraper 3 is worn off, the at least one force-applying assembly 30 applies force on the connecting component 20 to rotate it, hence driving the pivot shaft 2 to rotate along the direction opposite to the preparing direction R. Therefore, the belt scraper 3 constantly abuts the conveyor belt to clean it and the belt scraper 3 is automatically adjusted without manual adjustment, thereby effectively cutting down labor and maintenance costs.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An automatic belt-scraper-adjusting device configured to be connected to a pivot shaft of a scraper set, the automatic belt-scraper-adjusting device comprising:

a shell seat being hollow internally;

a connecting component pivotably mounted at the shell seat and comprising a connecting portion being hollow along an axial direction of the connecting portion; the pivot shaft of the scraper set extending into the connecting portion and fixedly connected to the connecting portion;

at least one force-applying assembly mounted inside the shell seat, connected to the connecting component, and applying a steady adjusting force to the connecting component;

wherein the connecting component is rotated along a preparing direction before connected to the pivot shaft, and then is rotated along a direction opposite to the preparing direction under the adjusting force applied by the at least one force-applying assembly, thereby driving the pivot shaft of the scraper set to rotate along the direction opposite to the preparing direction, and wherein each one of the at least one force-applying assembly is a constant-force spring and comprises an elastic ribbon rolled up and comprising a center end fixed and mounted at the shell seat; and a force-applying end mounted at the connecting component.

2. The automatic belt-scraper-adjusting device as claimed in claim 1, wherein the automatic belt-scraper-adjusting device comprises a latch assembly comprising an engaging latch mounted at the shell seat and comprising an operated section disposed at an outer side of the shell seat; and an engaging section connected to the operated section and extending into the shell seat; at least one latch elastic element mounted at the outer side of the shell seat and abutting the engaging latch and the shell seat; the connecting component comprises a ratchet portion; the engaging latch is pushed by the at least one latch elastic element, such that the engaging section abuts the ratchet portion of the connecting component to prevent the ratchet portion from rotating along the direction opposite to the preparing direction; and when the operated section is operated, the at least one latch elastic element is compressed and the engaging section is detached from the ratchet portion of the connecting component, therefore the connecting component is rotatable along the direction opposite to the preparing direction under the adjusting force applied by the at least one force-applying assembly.

3. The automatic belt-scraper-adjusting device as claimed in claim 2, wherein the shell seat comprises a latch-installing portion; the latch assembly is mounted at the latch-installing portion and comprises a plug movably mounted at the latch-installing portion; when the engaging section of the engaging latch is detached from the ratchet portion of the connecting component, the plug is able to be inserted into the engaging latch to prevent the engaging latch from being moved; and when the plug and the engaging latch are detached, the engaging section of the engaging latch is pushed by the at least one latch elastic element to abut the ratchet portion of the connecting component.

4. The automatic belt-scraper-adjusting device as claimed in claim 3, wherein the automatic belt-scraper-adjusting device comprises a warning module mounted at the shell seat and sensing rotational movements of the connecting component; when the connecting component is rotated along the direction opposite to the preparing direction to a terminal position, the warning module gives out a warning.

5. The automatic belt-scraper-adjusting device as claimed in claim 1, wherein when the connecting component is rotated along the preparing direction, the at least one force-applying assembly generates the adjusting force.

6. The automatic belt-scraper-adjusting device as claimed in claim 5, wherein the connecting component comprises an operating end extending out of the shell seat; a rotation-operating portion disposed at the operating end, disposed outside the shell seat, and extending along a direction perpendicular to the axial direction; the connecting component is rotated along the preparing direction through the rotation-operating portion.

7. The automatic belt-scraper-adjusting device as claimed in claim 5, wherein the shell seat comprises an outer shell; and a front panel mounted at a front side of the outer shell and comprising multiple guiding marks formed at an outer surface of the front panel and spaced apart from each other; the connecting component comprises a force-applied portion connected to the at least one force-applying assembly; the at least one force-applying assembly and the force-applied portion of the connecting component disposed inside the outer shell and disposed in an inner side of the front panel; a pointing element adjacent to the front panel and rotated along with the connecting component to point to a different one of the multiple guiding marks.

8. The automatic belt-scraper-adjusting device as claimed in claim 7, wherein the multiple guiding marks of the front panel are recessed in shape; the shell seat comprises at least one guiding rod; each one of the at least one guiding rod mounted at one of the multiple guiding marks of the front panel; when the connecting component is rotated to a terminal position, the pointing element contacts the at least one guiding rod.

9. The automatic belt-scraper-adjusting device as claimed in claim 4, wherein when the connecting component is rotated along the preparing direction, the at least one force-applying assembly generates the adjusting force.

10. The automatic belt-scraper-adjusting device as claimed in claim 9, wherein the connecting component comprises an operating end extending out of the shell seat; a rotation-operating portion disposed at the operating end, disposed outside the shell seat, and extending along a direction perpendicular to the axial direction; the connecting component is rotated through the rotation-operating portion along the preparing direction.

11. The automatic belt-scraper-adjusting device as claimed in claim 10, wherein the shell seat comprises an outer shell; and a front panel mounted at a front side of the outer shell and comprising multiple guiding marks formed at an outer surface of the front panel and spaced apart from each other; the connecting component comprises a force-applied portion connected to the at least one force-applying assembly; the at least one force-applying assembly and the force-applied portion of the connecting component disposed inside the front panel and the outer shell; a pointing element adjacent to the front panel and rotated along with the connecting component to point to a different one of the multiple guiding marks.

12. The automatic belt-scraper-adjusting device as claimed in claim 11, wherein the multiple guiding marks of the front panel are recessed in shape;

the shell seat comprises at least one guiding rod; each one of the at least one guiding rod mounted at one of the multiple guiding marks of the front panel;

the pointing element contacts the at least one guiding rod.

13. The automatic belt-scraper-adjusting device as claimed in claim 1, wherein the automatic belt-scraper-adjusting device comprises a warning module mounted at the shell seat and sensing rotational movements of the connecting component;

when the connecting component is rotated along the direction opposite to the preparing direction to a terminal position, the warning module gives out a warning.

14. A conveyor belt cleaner comprising:

a scraper set comprising a belt scraper; and a pivot shaft connected to the belt scraper;

at least one automatic belt-scraper-adjusting device disposed at an end of the pivot shaft and comprising a shell seat being hollow internally;

a connecting component pivotably mounted at the shell seat and comprising a connecting portion being hollow along an axial direction of the connecting portion; the pivot shaft of the scraper set extending into the connecting portion and fixedly connected to the connecting portion;

at least one force-applying assembly mounted inside the shell seat, connected to the connecting component, and applying a steady adjusting force to the connecting component;

wherein the connecting component is rotated along a preparing direction before connected to the pivot shaft, and then is rotated along a direction opposite to the preparing direction under the adjusting force applied by the at least one force-applying assembly, thereby driving the pivot shaft of the scraper set to rotate along the direction opposite to the preparing direction, and wherein each one of the at least one force-applying assembly is a constant-force spring and comprises an elastic ribbon rolled up and comprising a center end fixed and mounted at the shell seat; and a force-applying end mounted at the connecting component.

* * * * *